June 13, 1944.　　　　G. SWIFT　　　　2,351,081

RECORDING MEASURING INSTRUMENT

Filed July 29, 1941　　　　5 Sheets-Sheet 1

Inventor
Gilbert Swift
By Stevens and Davis
Attorneys

June 13, 1944.	G. SWIFT	2,351,081
RECORDING MEASURING INSTRUMENT
Filed July 29, 1941	5 Sheets-Sheet 2

Inventor
Gilbert Swift
By Stevens and Davis
Attorneys

June 13, 1944.                G. SWIFT                2,351,081
                    RECORDING MEASURING INSTRUMENT
                       Filed July 29, 1941            5 Sheets-Sheet 3
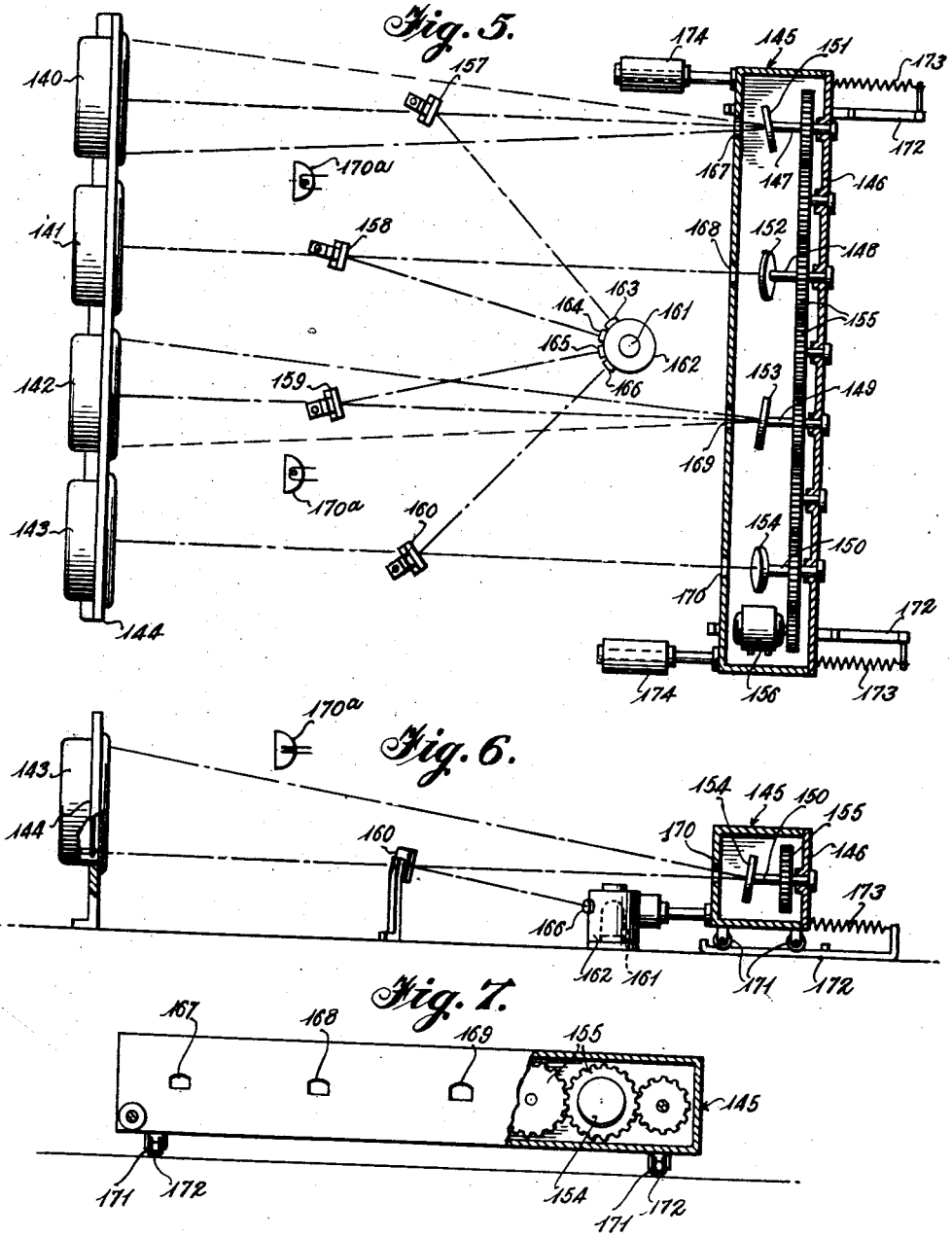
Inventor
Gilbert Swift
By Stevens and Davis
Attorneys

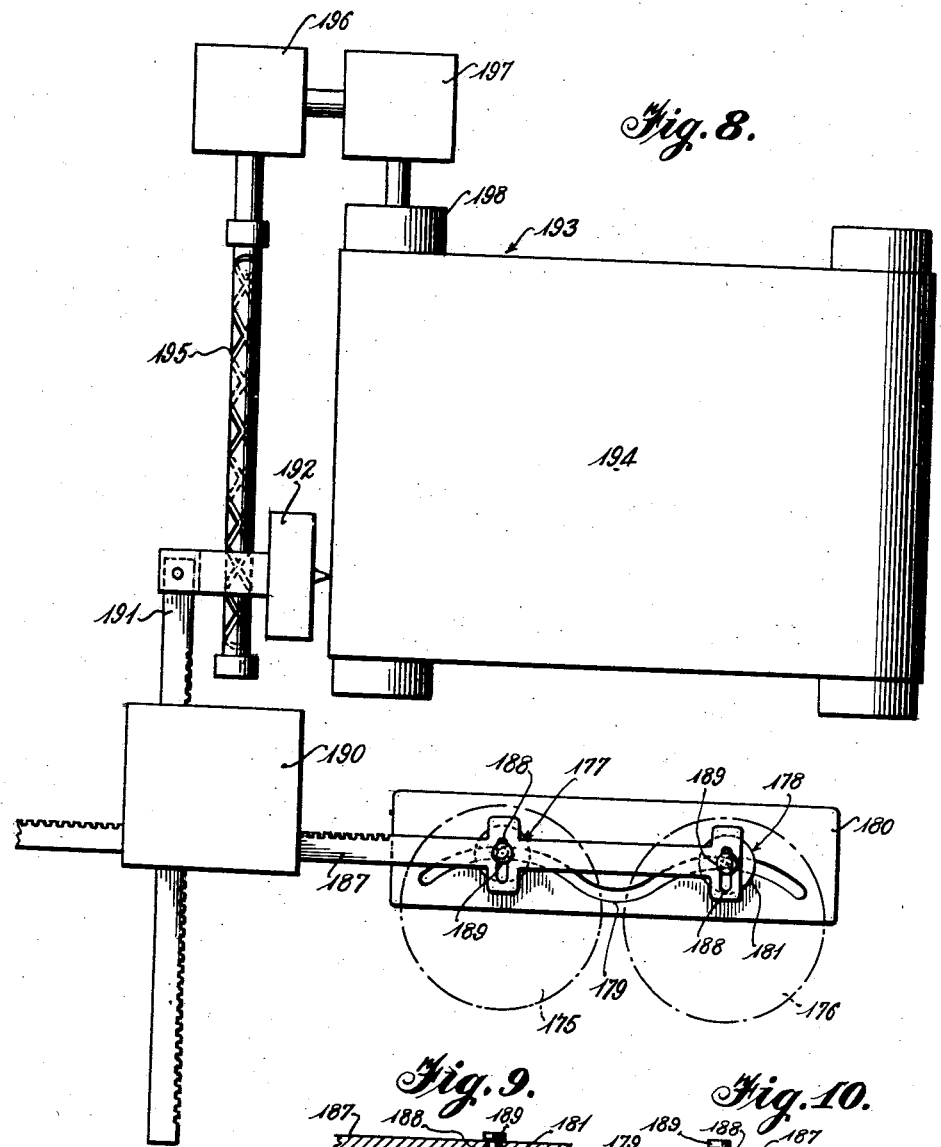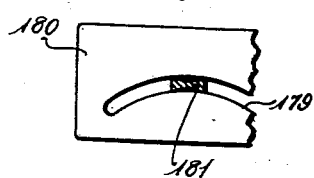

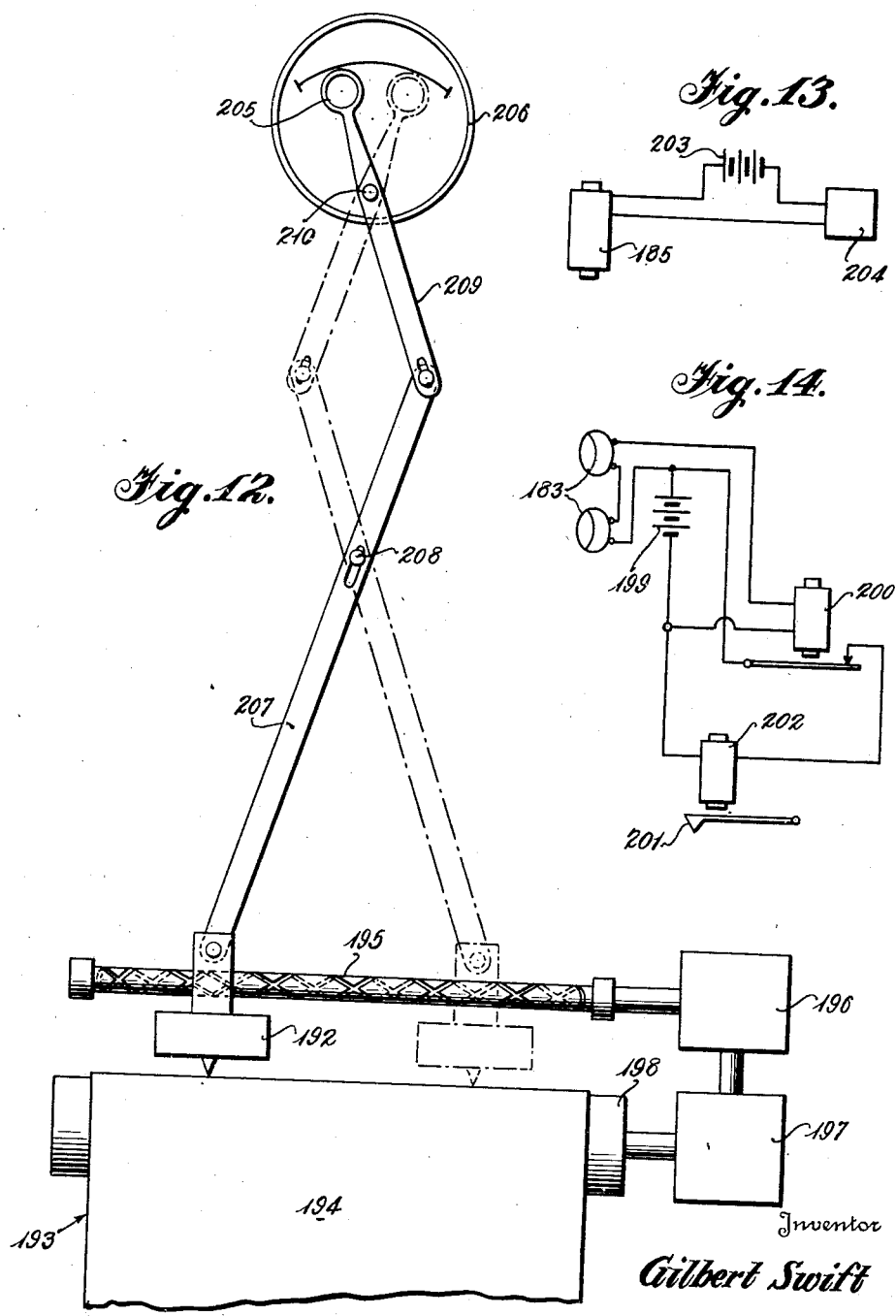

Patented June 13, 1944

2,351,081

UNITED STATES PATENT OFFICE 2,351,081

RECORDING MEASURING INSTRUMENT

Gilbert Swift, Tulsa, Okla.

Application July 29, 1941, Serial No. 404,560

1 Claim. (Cl. 234—1.5)

This invention relates to an improvement in recorders, and more particularly to a photoelectric recorder that will accurately record the readings of one or more standard meters, in correlation with any desired second variable and without alteration of the meter.

Electrical and other meters have been developed to the point where they are fairly well standardized and where they can be produced in quantities and sold at fairly low prices. However, it is often desirable to have not only visual indications of the measurements made by meters but to have records of these measurements in correlation with time, distance, feed of materials or some other factor. Consequently, various types of recording meters have been devised for the purpose of automatically producing such records. Such devices are usually either less sensitive, less accurate, or less rapid in response than instruments which indicate but do not make a record. Some prior art recording devices produce a record having a curvilinear scale, whereas another form of scale may be more desirable.

One type of device for producing such records makes use of a pen, attached to the pointer of the measuring instrument, in continuous contact with the chart. Considerable inertia and friction are thus introduced, reducing the sensitivity, accuracy, and speed of response of the measuring instrument, and requiring the use of a measuring instrument having a high torque.

Another form of recorder in which the effects of friction encountered in the type described above are greatly lessened, makes use of a pen, attached to the pointer of the measuring instrument, but not in continuous contact with the chart. The writing is accomplished by clamping the pointer in whatever position it may assume and then forcing the pen against the chart to produce a mark. This form of recorder is necessarily slower in response than an equivalent indicating instrument since the inertia of the moving system is increased by the pen and considerable time is consumed in clamping and depressing the pointer. The accuracy is also impaired since the clamping mechanism may cause a small deflection of the pointer from its proper position.

Other forms of recorders make use of various types of amplifiers to increase the torque available to move the recording mechanism, but these too are subject to inaccuracies greater than those encountered with non-recording measuring instruments. The devices of this type which are capable of the greatest speed are adaptable only for measuring electrical quantities.

Some of these recorders produce records having inaccuracies resulting from the failure of the printed coordinates of the chart paper to be properly aligned with respect to the pen or other marking mechanism. This misalignment may take the form of a shift of the measuring scale or the time scale, due to inaccurate location of the printed coordinates with respect to the driving holes, or it may be a change in the measuring scale due to stretch or shrinkage of the chart paper.

To avoid the above mentioned difficulties, and more particularly to provide a recorder that will record quickly and accurately the readings of one or more standard meters, is the purpose of the present invention.

To this end means have been provided for scanning the faces of one or a plurality of standard meters photoelectrically, either simultaneously or sequentially. Means have also been provided for recording the results of these scannings, and with them, if desired, the records of periodic scannings of the scales of the meter or meters. This makes a substantially continuous record of the meter readings and also a record of the scale or scales of the meter or meters in a place where they may be directly compared with the records of the meter readings. Furthermore, by controlling the interval between the making of the records of the meter scales, the records of the meter scales may be used for the second purpose of recording the progress of another variable such as time, distance, feed of materials or anything else of this nature that it is desired to record in correlation with the meter readings.

By using the device of this invention, an accurate record may easily be made of the variation of any quantity measurable by a standard meter in correlation with the lapse of time or with the progress of any other variable. A record of the measurements of several variables may be made at once by utilizing several meters and the variables that the device is capable of measuring may be easily and quickly changed by simply substituting one standard meter for another.

Where several meters are to be scanned simultaneously and the readings of all recorded on the same area of a single chart, it will be necessary for the meters to have identical scales in order to avoid confusion between the records of the scales. However, several meters having different scales may be scanned sequentially and a record made on a single recorder tape using a different longitudinal section of the tape for each record. In that manner the scale of each meter may be printed upon its proper section of tape, thus avoiding any possible confusion.

The principles of this invention may be applied in a number of ways as illustrated in appended drawings and the following detailed description. It is to be understood, however, that the embodiments shown in the drawings and described in the following detailed description are but illustrative of the principles of this invention and of its preferred embodiment and should not be construed as delineating the scope of the invention.

In the drawings:

Figure 5 is a plan view partly in section of a different embodiment of the principles of this invention according to which a plurality of meters are simultaneously scanned by the use of rotating mirrors;

Figure 6 is a side view partly in section of the same device;

Figure 7 is an elevational view partly in section of the scanner of the same device;

Figure 8 illustrates, also in a semi-diagrammatic form another embodiment of the principles of this invention in which a plurality of meters are scanned and their readings recorded;

Figures 9, 10 and 11 are sectional views of the device of Figure 8 showing the construction of certain parts thereof;

Figure 12 is a diagrammatic illustration of a modification of the device of Figure 8 in which a toggle is used instead of a gear box;

Figure 13 is a circuit diagram showing the circuit of Figure 8 which causes the scale of the meter to be scanned at the proper interval; and Figure 14 is a circuit diagram of the scanning and recording mechanism of Figure 8.

Figure 1:
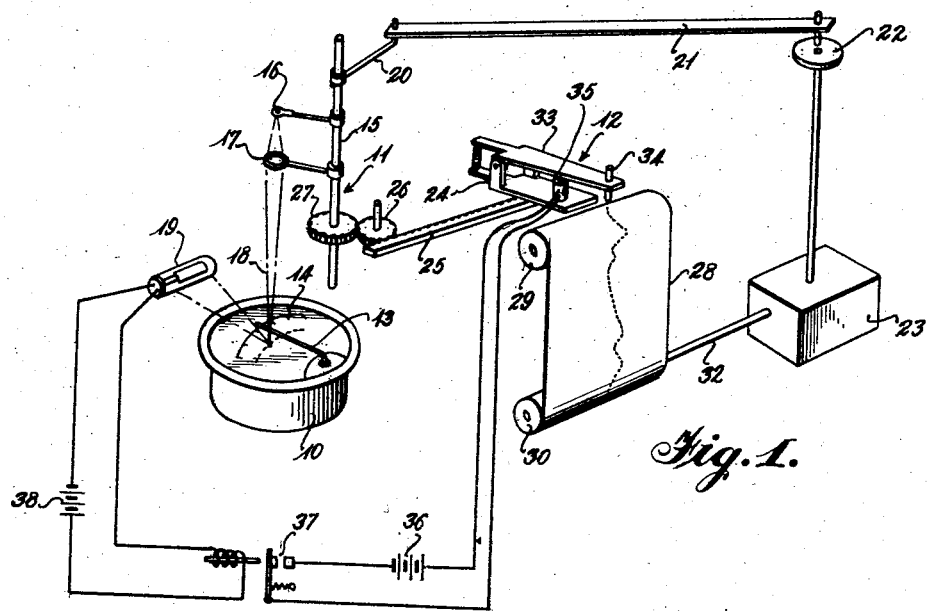
Figure 1 is a diagrammatic illustration of a relatively simple application of the principles of this invention to the recording of the readings of a single meter.

Referring to Figure 1 of the drawings, it is to be observed that the device therein illustrated comprises a measuring instrument 10, scanning mechanism generally designated by the reference character 11, and recording mechanism 12. The measuring instrument 10 is of a conventional type suited for indicating changes in a varying factor such as pressure, temperature, voltage, current, power consumption, or any other significant variable. The instrument comprises an indicating pointer 13 having a locus of movement corresponding to a graduated scale 14 provided on the face of the instrument.

The scanning device 11 comprises a shaft 15 carrying a light source 16 and a lens 17 arranged in a manner such that a concentrated beam of light 18 is directed upon the face of the measuring instrument 10 and reflected therefrom to a phototube 19 substantially as shown. The face of the instrument is of a material capable of reflecting most of the light falling thereon whereas the indicating pointer 13 is formed of opaque substance incapable of reflecting appreciable light from the source 16 to the photocell 19. Since the usual meter has a light colored card and a black pointer it is usable for this purpose without change. The shaft 15 is oscillated by means of a crank arm 20 mounted thereon, connected by a link 21 to an eccentric 22 rotated by a motor 23. The motor 23 preferably operates at a constant speed thus causing the beam of light 18 to traverse the locus of motion of the indicating pointer 13 continuously and in identical time intervals.

The recording mechanism 12 comprises a sliding carriage 24 moved by a rack 25 which is connected thereto and engages a pinion gear 26 driven by a gear 27 mounted upon the shaft 15. By reason of the oscillatory motion of the shaft 15, the carriage is caused to reciprocate transversely with respect to a record sheet 28 carried on rollers 29 and 30. The record sheet is transferred from roller 29 to roller 30 as the latter is rotated by a shaft 32 driven by the motor 23. The carriage 24 is provided with a recording member 33 including a stylus or pen 34 adapted to mark the record sheet 28 upon operation. An electromagnet 35 operates the stylus. This electromagnet is connected to a power source such as a battery 36, through a relay switch 37. The switch 37 is controlled by the photocell 19 and a power source 38. As long as current passes from the power source 38 through the photocell the relay is held open but when the light beam 18 is interrupted by the indicator arm 13 the relay is permitted to close and this operates the marking stylus.

In operation the scanning mechanism causes the locus of movement of the indicator arm 13 to be traversed by the light beam 18. A current continuously flows through the photo tube 19, maintaining the relay 37 in open circuit position except momentarily when the light beam is intercepted by the indicator arm. Simultaneously the carriage 24 is reciprocated transversely across the record sheet 28 as above described. When the light beam is interrupted by the indicator arm, the relay 37 momentarily assumes closed circuit position and the electromagnet 35 is energized, causing the recording member 33 to move against the sheet 28 thereby making a visual impression thereon.

Figure 2:
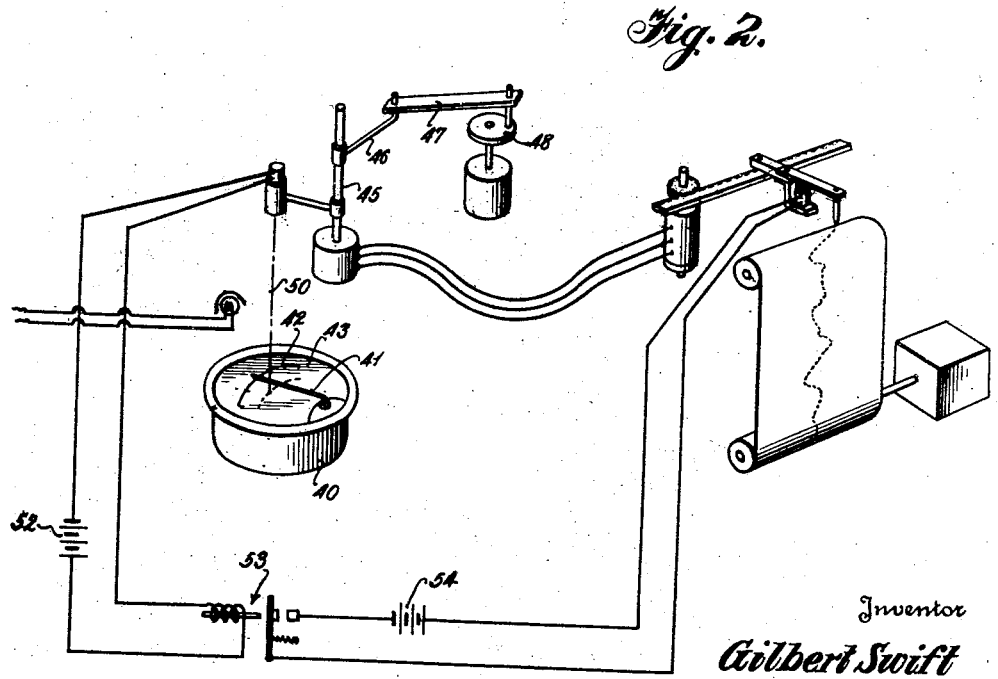
Figure 2 illustrates diagrammatically a modification of the device of Figure 1 wherein the recorder and the scanning device are separated and driven in synchronism by an electrical transmission system.

Referring to Figure 2 of the drawings, it is to be observed that the device therein illustrated comprises a measuring instrument 40 provided with a pointer 41 having a locus of motion corresponding to the graduated scale 42 appearing on the instrument face plate 43. A light source 44 mounted upon an arm extending from a shaft 45, is oscillated by means including a lever arm 46 linked by a member 47 to a crank wheel 48 rotated by a motor 49. A beam of light 50 emanating from the light source 44 impinges upon the instrument face plate 43 and is reflected thereby to a photocell 51 through which current normally flows from a battery 52 to maintain a relay 53 in open circuit position. During oscillation of the light source 44, the beam of light is interrupted by the pointer 41 thereby causing interruption of the current flowing through the photocell 51 with resultant shifting of the relay 53 to closed circuit position. When this occurs, current passes from a battery 54 to energize an electromagnet 55 which acts upon a recorder bar 56, thus causing a stylus 57 to be pressed against a moving record sheet 58.

The recorder bar 56 is continuously reciprocated transversely with respect to the record sheet by a rack 59 driven by gear wheel 60 rotated by the motor 61 of an electrical transmission system such as the "Selsyn" system. The motor 61 is operated by a generator 62 which in turn is driven by a motor 49 on shaft 45. Thus, the reciprocating motion of the recorder bar 56 corresponds in rate to the rate of oscillation of the shaft 45.

The record sheet 58 is transferred from a roll 63 to a roll 64 by a source of power 65. This embodiment of the present invention differs from the embodiment illustrated in Figure 1 in that the recording mechanism can be located at any desired distance from the measuring instrument.

Figure 3:
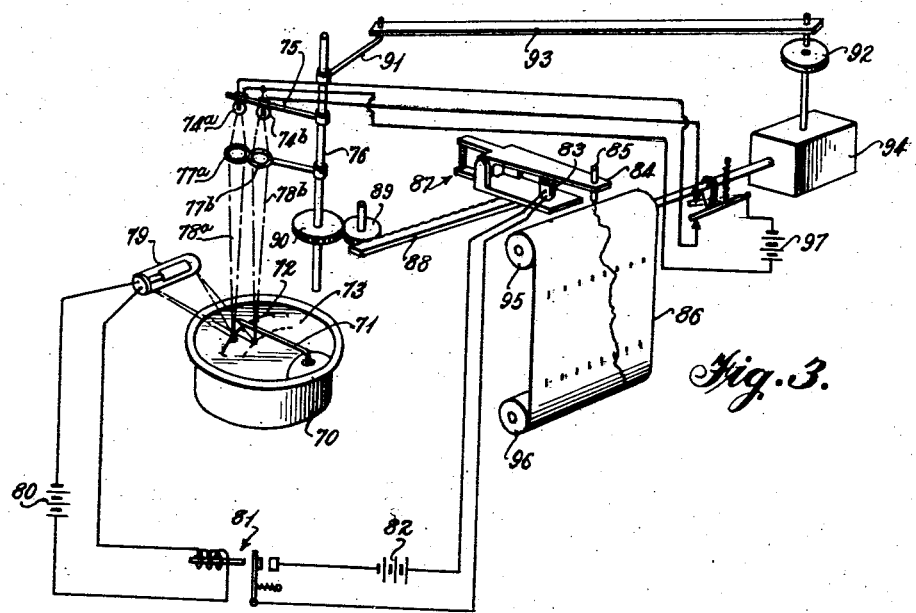
Figure 3 illustrates diagrammatically an improvement on the device of Figure 1, according to which the scale of the meter is scanned and printed at regular intervals.

The embodiment of the invention illustrated in Figure 3 of the drawings comprises a measuring instrument 70 having an indicator pointer 71 movable across a graduated scale 72 appearing on the instrument face plate 73. A pair of light sources 74a and 74b mounted upon an arm 75 carried by a shaft 76 transmit beams of light which are concentrated by lenses 77a and 77b respectively, whereby the light beams 78a and 78b respectively, impinge upon the light reflective surface of the instrument face plate 73 from which both beams are reflected to a phototube 79. It is to be noticed that the light beam 78a emanating from the light source 74a impinges upon that portion of the instrument face plate 73 whereon the graduated scale 72 appears whereas light beam 78a emanating from the light source 74b impinges upon a different portion of the instrument face plate and is wholly reflected to the photocell except when the beam is intercepted by the indicator pointer 71. Current from a battery 80 flows through the photocell 79 when the same is illuminated from either of the light sources and maintains a relay 81 in open circuit position.

When both light beams are interrupted, current ceases to flow through the photocell and the relay 81 thereupon assumes closed circuit position, thereby connecting a battery 82 with an electromagnet 83 as will be apparent upon examination of the drawings. When the electromagnet 83 is energized as above described, a recorder arm 84 is moved causing a stylus 85 to make a mark upon a record sheet 86.

The recorder arm 84 is mounted in a carriage assembly 87 that is reciprocated transversely with regard to the record sheet 86 by a rack bar 88, driven by a pinion gear 89 meshing with gear 90 mounted upon the shaft 76. The shaft 76 is oscillated by means including a crank arm 91 coupled to a crank wheel 92 by a bar 93. The wheel 92 is rotated continuously by a motor 94 which also operates to cause transference of the record sheet 86 from a roll 95 to a roll 96.

The light sources 74a and 74b do not operate simultaneously but are connected with a battery 97 by a selector switch 98 intermittently operated by a cam 99 mounted upon the drive shaft of the motor 94. In operation the instrument face plate is scanned in a manner similar to that described in the embodiments of the invention illustrated in Figures 1 and 2. However, in this instance, the graduated scale 72 of the instrument is periodically scanned thus causing the scale to be reproduced upon the record sheet 86 in addition to the record of the pointer position relative to the scale. This embodiment of the invention permits use of unprinted record paper and assures proper correspondence between the coordinates of the record sheet which are equivalent to the scale graduations and the record curve. Furthermore, since the scale is scanned at intervals, the longitudinal distances between scale indications on the record sheet, are indications of those intervals, so that the meter readings are plotted on the recorder paper against the background of meter scale in one direction and the intervals of scanning the meter scale in the other direction.

Figure 4:
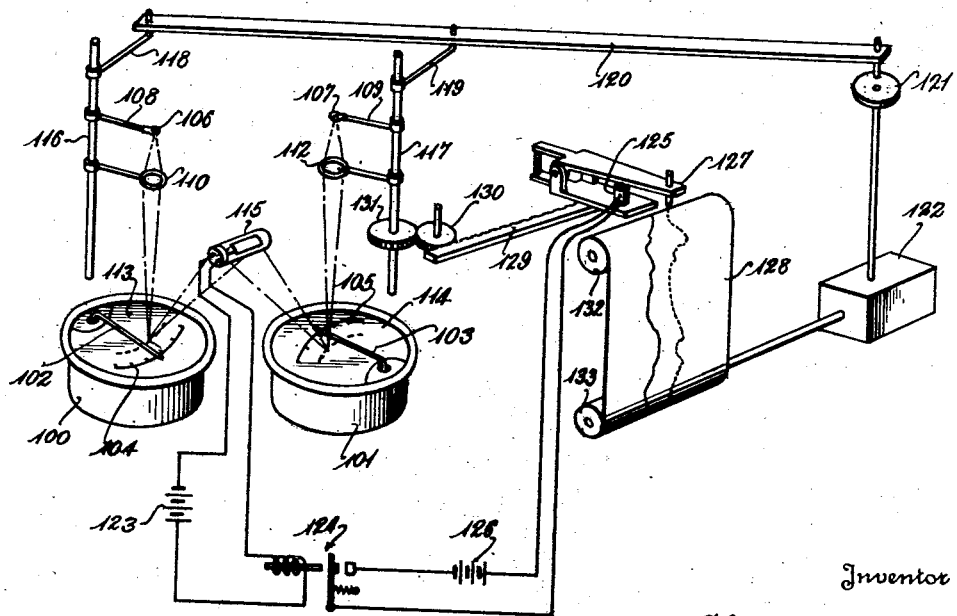
Figure 4 illustrates a further modification of Figure 1 by which modification the readings of two meters are simultaneously observed and recorded.

Referring to Figure 4 of the drawings, it is to be observed that two measuring instruments 100 and 101 are provided, each of which includes a pointer arm numbered 102 and 103 respectively, having a locus of motion defined by graduated scales 104 and 105 respectively. A pair of light sources 106 and 107, mounted upon arms 108 and 109 respectively, emit beams of light which when focused by lenses 110 and 112 respectively, impinge upon the instrument face plates 113 and 114 respectively, from which they are reflected to a photocell 115. The arms 108 and 109 are mounted upon shafts 116 and 117 respectively, which are oscillated by means including crank arms 118 and 119 respectively, engaging with a link 120 reciprocated by a crank wheel 121 mounted upon the drive shaft of a motor 122. Operation of the motor causes the light beams to oscillate across the locus of motion of pointers 102 and 103, whereby light is continuously reflected from the instrument face plates to the photocell 115. A current flows through the photocell from a battery 123, except when the illumination of the photocell is diminished by interception of the light beams by one of the pointers 102 or 103. Flow of current through the photocell maintains a relay 124 in open circuit position, but when this current flow is diminished as above mentioned, the relay assumes a closed circuit position, thereby connecting an electromagnet 125 with a battery 126 causing a recording arm 127 to make an impression upon a record sheet 128. As in the previously described embodiments of this invention the recorder arm is mounted in a carriage which is reciprocated by a rack 129 driven by a pinion gear 130 that in turn meshes with a gear 131 mounted upon the shaft 117 rotated by the motor 122. The record sheet 128 is continuously transferred from a roll 132 to a roll 133 during operation of the device. This embodiment of the present invention permits simultaneous recording of changes in two measured variables with respect to time or another selected factor which can be related to the rate of operation in the motor 122. The dual indication appears upon the record sheet as a pair of distinct curves essentially as illustrated.

An important feature of devices according to this invention is that the response periods thereof can be readily altered by adjustment of the scanning rate which can be easily accomplished by control of the motor speed.

In Figures 5, 6 and 7 there is shown a different embodiment of the principles of this invention wherein four standard meters are sequentially scanned by rotating mirrors. According to these figures four standard meters 140, 141, 142 and 143 are mounted in panel 144 so that they face a scanning device 145. This scanning device 145 comprises a housing 146, in which are rotatably mounted four shafts 147, 148, 149 and 150, each shaft being in alignment with the pivot point of the needle of a different meter. On the end of each shaft is a mirror mounted so as to be not quite normal to the shaft. These mirrors have been numbered 151, 152, 153 and 154, respectively. The shafts 147, 148, 149 and 150 are all geared together by gear train 155 driven by a motor 156 so that all the shafts rotate together. Between the scanner housing 146 and the meter panel are a series of small mirrors 157, 158, 159 and 160 arranged so as to reflect light from the four mirrors 151, 152, 153 and 154 onto a photocell 161, contained within a housing 162, which housing is provided with focusing lenses 163, 164, 165 and 166. By this arrangement the photocell is constantly focused upon each of the rotating mirrors and, if the mirrors are in the proper position from them, onto their respective meter faces.

As each mirror revolves there is one portion of its revolution where it directs the focus of the photocell onto the face of its corresponding meter in such a manner as to cause the photocell to scan a line across the face of that meter. During the remainder of its revolution, the scanner housing 146 prevents its being operative to cause further scanning, since only restricted openings 167, 168, 169 and 170 are provided in the housing.

By properly arranging the parts, each mirror may be caused to scan, for example, through a quarter of a revolution and the scanning of the next meter will then be commenced by the next mirror and the first mentioned mirror will become inoperative. Thus, the faces of the meters will be sequentially scanned and a record of the readings of the various meters may be plotted one after another across the face of the recording strip of a recorder of the type shown in Figure 2, operated by a motor which rotates in synchronism with the motor 156. Thus, the chart will be divided longitudinally into fourths and each fourth will contain the record of one of the meters. Light on the face of the meters is of course, provided from any suitable source such as the lights 170a.

In order to record the scales of the meters periodically the scanner housing 146 may be supported upon wheels 171 on a track 172 so that it can move toward and away from the meter panel, thus moving the line of scanning onto and off of the meter scale. For the purpose of causing this motion, the scanner housing may be held in one position by a spring 173 and solenoids 174 may be provided for the purpose of moving it to the other position. Thus, as shown in the figures, when the scanner housing 146 is moved forward, the line of scanning will fall below the meter scale and when the scanner housing is allowed to move back from the meter panel, the line of scanning will be raised to include the meter scale. No operating circuit is shown for the solenoids 174 but it will be apparent that these solenoids may be actuated in accordance with the passage of time, measurements of distance traversed, measurements of quantity of flow, or measurements of any other variable of this nature.

It is obviously possible, with the device of the type shown in Figures 5, 6 and 7, to accomplish simultaneous scanning of the four meters by mounting all four of the mirrors 151, 152, 153 and 154 in the same relation to the respective shafts and either rotating or oscillating the mirrors in unison. The circuit of the photoelectric cell may then be such that interruption of the light path by the needle of any one of the meters will cause a signal to be sent to the recorder and the record will thus be made as in Figure 4, of the readings of all of the meters on the same width of recorder strip. If this is done, however, the meters should have exactly duplicate scales in order to avoid confusion between the scales of the meters when an attempt is made to read the values of the curves plotted on the recorder.

In Figures 8, 9, 10, 11, 13 and 14 is illustrated still a different embodiment of the principles of the present invention. According to this embodiment two or more meters 175 and 176 are scanned by scanning devices 177 and 178 which move in a cam track 179 formed in a member 180. Each of the scanning devices includes the cam follower 181 which slides in the cam track 179 and to which is pivoted a housing 182 which contains a photocell 183 and a lens 184 for focusing the photocell on the scale of the meter which it is to scan. The member 181 is shaped as shown in Figure 11 so as to prevent the scanning device from rotating about a vertical axis. A small magnet 185 is carried by the cam follower 181 and positioned so as to cooperate with a lug 186 on the housing 182 so as to tilt this housing through a small angle when the magnet is energized. The housing returns to its normal position either by gravity or by the action of the spring (not shown) when the magnet is de-energized. As the scanning device travels the cam track, it normally scans the face of the meter under it at a point just below the scale of the meter. When, however, the magnet 185 is energized, the housing 182 is tilted and the device scans the meter across the scale.

The scanning devices 177 and 178 are moved back and forth in the cam track by a rack 187 which has a transverse slot 188 at each scanning device. The scanning device is attached at this slot by means of a bolt 189 screwed into the cam follower 181 but free to slide transversely in the slot 188.

As shown in Figure 8, a separate scanning device is provided for each meter and in such a case the two scanning devices are connected in a circuit, to be described later, in such a manner that either scanning device will operate the marker for the recorder.

The rack 187 is oscillated by a gear box 190 which in turn is operated by a rack 191 from the stylus or marker 192 of a recorder 193. The stylus or marker is of the magnetic type and is arranged to operate when the electrical circuit to it is broken by actuation of the scanning devices as will hereafter be described. The marker 192 is oscillated back and forth across the tape 194 of the recorder by a helical cam 195 of the type usually found in the winding devices for fishing reels. This cam is driven through a gear box 196 by a motor or other source of power 197 which also drives the roll 198 which supports one end of the recorder tape 194.

Thus, as the scanning devices move back and forth across the meter, the marker 192 moves back and forth across the recording tape and as the scanning devices cross the needles of the meters, the marking device makes a mark on the paper. At the same time, the recording tape is driven through the roll 198. Periodically, the magnets 185 are actuated to tilt the scanner housing and the scales of the meters are recorded by the marker member 192 on the recorder tape.

The circuit for the operation of the marker member 192 is shown in Figure 14. As can be seen from this figure, the two photocells 183, one for each of the scanning devices 177 and 178, are connected in series to a battery 199 and a relay 200. The marker device comprises a pen or stylus 201 held away from the paper by a magnet 202 which is connected in series with the battery 199 and the contacts of the relay 200. Thus, upon reduction of current in the relay circuit by either photocell, a mark is made on the recorder tape.

In order to avoid confusion between the meter scales printed on the recorder tape, the scales of the two meters should be identical. In this case, it is only necessary to scan the scale of one of the meters to obtain the proper scale on the recorder tape. However, both meter scales may be scanned, if desired, and in some instances this is desirable because it is a check to prove that the two scales are identical. A circuit for causing the scanning of one of these recorder scales is shown in Figure 13 which illustrates the fact that the tilting magnets 185 are connected in series with a battery 203 and a controlling switch 204. The controlling switch may be operated by a clock mechanism, by a depth indicating mechanism, or by any other mechanism that will cause the switch to be closed at the desired intervals of time, depth, or other factors.

As illustrated and as so far described, the two or more meters 175 and 176, will be simultaneously scanned and printed together upon the same width of recorder tape. If desired, however, by a very simple change of the instrument, the several meters may be scanned sequentially and a record of each of these scannings made on a separate longitudinally extending section of recorder strip. For example, using two meters as is shown in Figure 8, the second scanning device 178 may be omitted and the photocell of the first scanning device connected directly in series with the battery 199 and the relay 200.

The gears in gear box 190 may then be changed so that the scanning device 177 travels completely across the face of the two meters while the marking device travels across the width of the recording strip. A record of the scanning of the meter 175 will then be placed on one longitudinal half of the recording strip and a record of the scanning of the meter 176 will be placed on the other longitudinal half of the recording strip. Then, when the scales of the two meters are recorded, they will each be recorded on the appropriate half of the record strip and therefore the scales may be entirely different if desired.

To avoid making a mark on the recorder strip when the scanning device passes from one meter to another, a strip of reflecting paper or tape may be placed across the frames of the meters and the intervening space at the place the scanning beam crosses.

As can readily be seen, the device may be readily adapted by changing the gearing in the gear box 190 to the scanning of one, two, three or more meters, either sequentially or simultaneously. Furthermore, by the changing of the gearing in the gear box 190 the rate of scanning as compared to the rate of movement of the recorder tape may also be changed. The result is a very flexible recorder adapted for use with standard meters and easily adjustable to meet many situations. For example, by the changing of the gearing in the gear box 190, rack, 187, the cam track 180 and the scanning devices 177 and 178, the device may be readily adapted to the making of either simultaneous or sequential recordings, of practically any number of standard meters. Thus, a supply of gears and the interchangeable parts may be provided for the recorder and it can thus be given a very wide scope of application.

Still further, cams and levers may be provided in the gear box 190 so as to convert the type of motion of the rack 191 into an entirely different type of motion in the second rack 187. Thus, the rack 191 may have rectilinear motion and the rack 187, harmonic or logarithmic motion with respect thereto. This will serve to convert the meter scales into any desired form of scales for recording.

A slightly different embodiment of the principles of this invention are shown in the device illustrated in Figure 12. In this device, the scanning device 205 is the same as scanning devices 177 and 178, and scans the standard meter 206. All of the recorder parts except the connection between the scanning device and the marking device are the same as have been illustrated in Figures 8, 9, 10 and 11. They have therefore been marked with the same numbers.

Instead of having a gear and rack connection between the marking device 192 and the scanning device 205, the device of Figure 12 has a lever connection between the marking and scanning devices. Thus, a lever 207 is pivoted at 208, connected at one end to the marking device 192 and at the other end to a second lever 209, pivoted at 210, and carrying the scanning device 205 at its opposite end.

Slot and pin connections are provided at the point where the lever 207 is pivoted and at the point where the levers 207 and 209 are joined together, to prevent the lever arms from binding as they are moved. The movement of the marking member 192 then moves the scanning device 205 to cause it to scan the scale of the meter 206 as in Figure 8. By adjusting the relative lengths of the lever arms, the lengths of the scanning stroke relative to the movement of the marking member may be adjusted so that all or only a part of the meter range is scanned.

I claim:

Apparatus for recording the pointer readings and the scale markings of a meter upon a single record surface that comprises light sensitive means to scan by reflected light two lines across the face of the meter, one of said lines crossing the pointer of the meter and the other line traversing the scale markings of the meter, a marking device, means to repeatedly move the scanning means, means to move said marking device in synchronism therewith across a recording surface, means to advance the marking device and recording surface relative to each other so that the markings will occur progressively along the recording surface, and means responsive to the reception of reflected light by said light sensitive means to actuate the marking device each time the reflected light is interrupted by the pointer or a scale marking of the meter.

GILBERT SWIFT.